United States Patent
Park et al.

(10) Patent No.: US 10,438,088 B2
(45) Date of Patent: Oct. 8, 2019

(54) VISUAL-SALIENCY DRIVEN SCENE DESCRIPTION

(71) Applicant: INTEL CORPORATION, Santa Clara, CA (US)

(72) Inventors: Mi Sun Park, Hillsboro, OR (US); Yeongseon Lee, Chandler, AZ (US); Omesh Tickoo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 268 days.

(21) Appl. No.: 15/372,508

(22) Filed: Dec. 8, 2016

(65) Prior Publication Data

US 2018/0165539 A1 Jun. 14, 2018

(51) Int. Cl.
*G06K 9/46* (2006.01)

(52) U.S. Cl.
CPC .................. *G06K 9/4671* (2013.01)

(58) Field of Classification Search
None
See application file for complete search history.

(56) References Cited

U.S. PATENT DOCUMENTS

2007/0031016 A1* 2/2007 Gundel .................. A61B 6/032
382/128

\* cited by examiner

*Primary Examiner* — Bernard Krasnic
(74) *Attorney, Agent, or Firm* — International IP Law Group, P.L.L.C.

(57) ABSTRACT

An electronic device for visual-saliency driven scene description is described. The electronic device includes a property identifier to identify properties of a target platform. The properties include target platform device type and target platform device count. The electronic device also includes a salient region detector to detect a salient region of an input in response to the target platform device type being a graphical processing unit (GPU) and the target platform device count being above one. The electronic device further includes a description provider to provide a fine-grained scene description for the salient region.

25 Claims, 10 Drawing Sheets

100B

A hamster is eating sunflower seeds.

US 10,438,088 B2

VISUAL-SALIENCY DRIVEN SCENE DESCRIPTION

TECHNICAL FIELD

The present disclosure relates to techniques for scene description. More specifically, the present techniques relate to visual saliency detection as pre-processing for the scene description process.

BACKGROUND ART

Visual saliency is the perceptual quality that makes some items stand out from their surroundings and immediately grab a person's attention. When viewing a photograph, visual saliency enables the viewer to identify the most distinctive and informative parts of the image. Technological advances have made it possible for computing devices to identify the most important parts of an image using saliency detection methods.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1A:
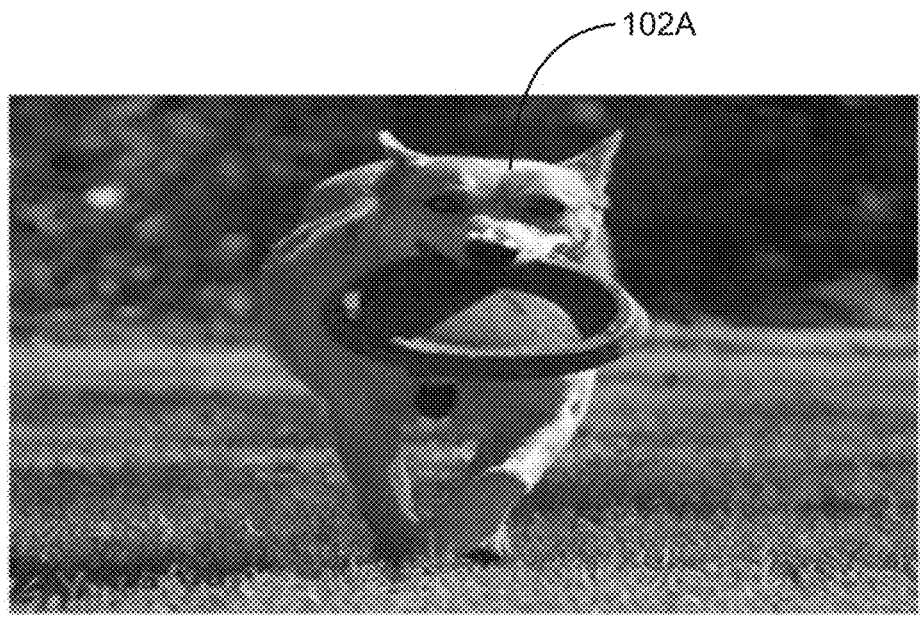
FIG. 1A is an example of an image from an available dataset.

Real-world images are not like publicly available datasets where tasks, e.g., objects, are located at the center of the image or task-relevant information is uniformly distributed throughout the entire image. As used herein, a real world image is an image that is captured for personal or professional use and is not captured with specific requirements for a dataset. Therefore, processing the entire image, with the underlying assumption that all regions of the image contain the same amount of information, is clearly not practical for real-world images. Processing real-world images in this fashion is computationally expensive and often yields poor results.

The subject matter disclosed herein relates to techniques for identifying and appropriately describing key content in high-resolution real-world images, especially those images captured using a camera with a wide field of view. A visual-saliency driven technique processes a real-world image and provides detailed information about the context of the important and interesting regions of the image. Saliency detection is the identification of the most distinctive, important, and informative parts of an image. Saliency detection reduces computational costs by enabling the subsequent description process to focus on a few salient regions rather than a whole high-resolution image. The scene description process handles each of the identified salient regions in sequence serially or simultaneously if the salient regions are not scattered throughout the image. The handling of the salient regions depends on the degree of description granularity sought. In general, saliency detection provides a sequence of words describing the context of the scene as compared to saliency recognition which provides a single class label.

Saliency detection pre-processes an image so that the subsequent description process can focus on a specific area of interest rather than the entire image. A fine-grained scene description can be obtained when saliency detection filters out unimportant areas of an image. The description process can also result in a coarse-grained description or saliency recognition depending on the hardware resources and real-time requirements of the target platform.

The techniques described herein relate to visual-saliency driven scene description. For example, the properties of a target platform may be identified. The properties identified may include a target platform device type and a target platform device count. A salient region of an input image may be detected in response to the target platform device type being a graphical processing unit (GPU) and the target platform device count being above one. A fine-grained scene description may be provided for the salient region.

In the following description, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

FIG. 1A is an example of an image 100A from an available dataset. Available datasets are pre-processed. As a result, important tasks are already in the center of the image and dominate the entire image. The dog 102A in FIG. 1A is a good example of this. The dog 102A is at the center of the image and is obviously the subject of the image. Images like that in FIG. 1A are commonly used to train and test scene description mechanisms.

Figure 1B:
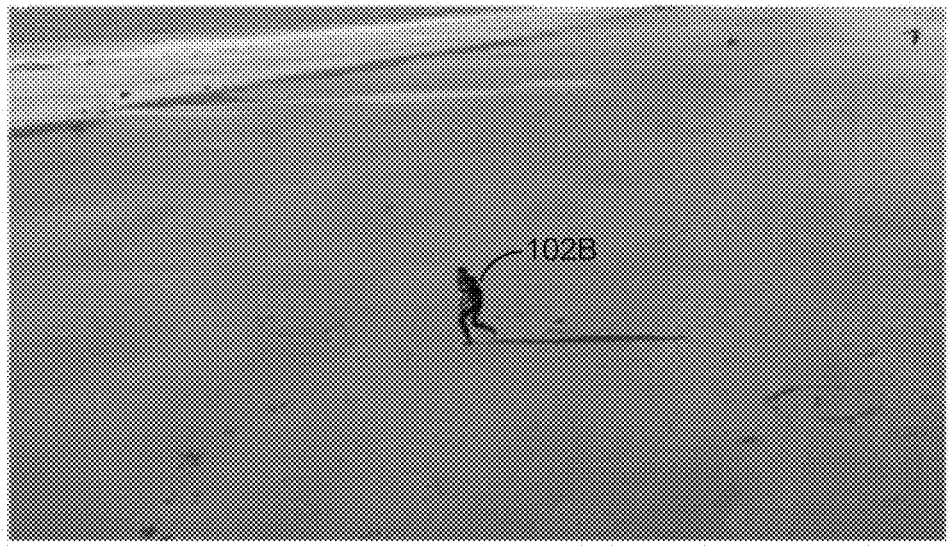
FIG. 1B is an example of a real-world image.

FIG. 1B is an example of a real-world image 100B. The important task is the person 102B in a small localized region of the image 100B. The comparison of FIGS. 1A and 1B demonstrates how real-world images often differ from images in available datasets. Unlike the dog 102A in image 100A, the person 102B does not dominate image 100B.

Figure 1C:
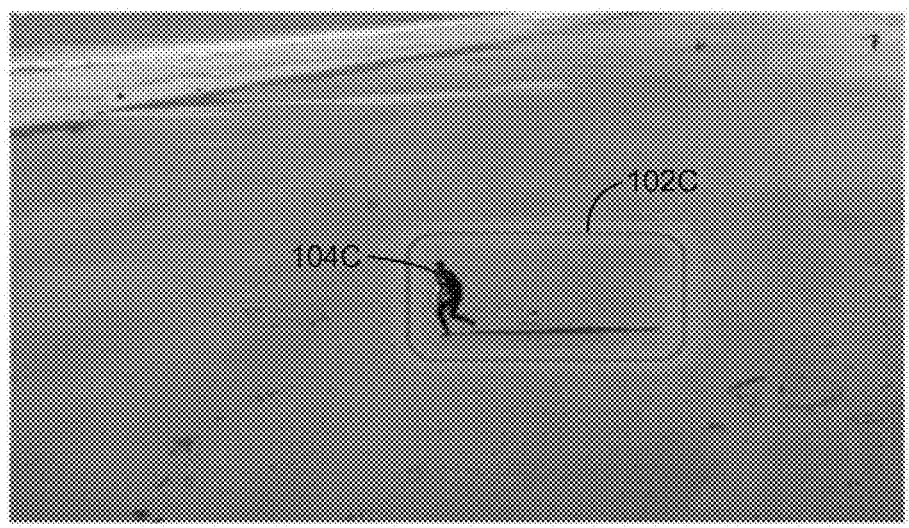
FIG. 1C is an image showing the identified salient region of the image in FIG. 1B.

FIG. 1C is an image 100C showing the identified salient region 102C of the image 100B in FIG. 1B. The salient region 102C is similar to the image 100A from an available dataset in that the person 104C dominates the salient region 102C just as the dog 102A dominates the image 100A in FIG. 1A. Only the salient region 102C of image 100C may be subjected to further processing, i.e., scene description. The present techniques are used to identify the salient region, such as salient region 102C, regardless of the information contained in the image. Further, the present techniques provide an improvement to visual saliency as well as a computing device used to determine visual saliency.

Figure 2:
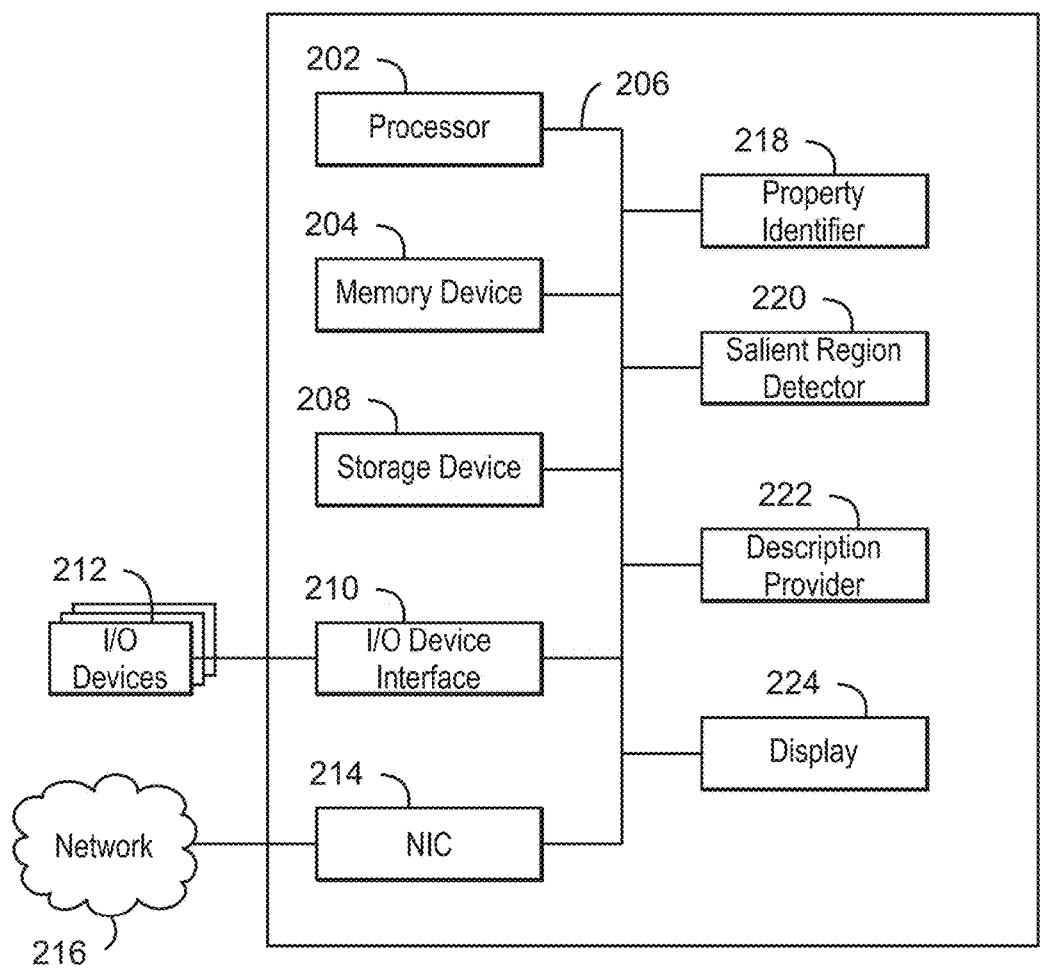
FIG. 2 is a block diagram of an electronic device for visual-saliency driven scene description.

FIG. 2 is a block diagram of an electronic device 200 for visual-saliency driven scene description. For example, the electronic device 200 may be a desktop computer, laptop computer, tablet computer, mobile phone, smart phone, or any other suitable electronic device. The electronic device 200 may include a processor 202 that is configured to execute stored instructions, as well as a memory device 204 that stores instructions that are executable by the processor 202. The processor 202 may be coupled to the memory device 204 by a bus 206. The processor 202 may be a single core processor, a multi-core processor, a computing cluster, or any number of other configurations. The processor 202 may be implemented as a Complex Instruction Set Computer (CISC) processor, a Reduced Instruction Set Computer (RISC) processor, x86 Instruction set compatible processor, or any other microprocessor or processor. In some embodiments, the processor 202 includes dual-core processor(s), dual-core mobile processor(s), or the like.

The memory device 204 may include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory system. The memory device 204 can be used to store data and computer-readable instructions that, when executed by the processor 202, direct the processor 202 to perform various operations in accordance with embodiments described herein.

The electronic device 200 may also include a storage device 208. The storage device 208 is a physical memory device such as a hard drive, an optical drive, a flash drive, an array of drives, or any combinations thereof. The storage device 208 may store data as well as programming code such as device drivers, software applications, operating systems, and the like. The programming code stored by the storage device 208 may be executed by the processor 202 or any other processors that may be included in the electronic device 200.

The electronic device 200 may also include an input/output (I/O) device interface 210 configured to connect the electronic device 200 to one or more I/O devices 212. For example, the I/O devices 212 may include a printer, a scanner, a keyboard, and a pointing device such as a mouse, touchpad, or touchscreen, among others. The I/O devices 212 may be built-in components of the electronic device 200, or may be devices that are externally connected to the electronic device 200.

The electronic device 200 may also include a network interface controller (NIC) 214 configured to connect the electronic device 200 to a network 216. The network 216 may be a wide area network (WAN), local area network (LAN), or the Internet, among others.

The electronic device 200 may further include a property identifier 218. The property identifier 218 identifies properties of the target platform. The identified properties may include target platform device type and target platform device count. The platform device type may be a graphical processing unit (GPU) or a central processing unit (CPU). The platform device count may be an integer value indicating the number of GPUs present. Additional identified properties may include available memory of the target platform and a resource requirement of a kernel executing on the target platform. For example, the property identifier 218 may be a low-level application programming interface (API). An API is a set of subroutine definitions, protocols, and tools for building software and applications. An API makes it easy to develop a program by providing all the building blocks, which are then put together by a programmer. A low-level API allows a programmer to manipulate functions within software and hardware at a very granular level.

A salient region detector 220 may detect a salient region of an input. The input may be an image or a sequence of images. The salient region detector 220 may detect a salient region of an image or a sequence of images in response to the target platform device type being a graphical processing unit (GPU) and the target platform device count being above one. The target device count is an integer value identified by the low-level API used to determine the properties of the target platform.

A description provider 222 may provide a fine-grained, i.e., very detailed, description of the salient region detected by the salient region detector 220. The fine-grained scene description may be composed of natural language text. The natural language text may indicate the contents of the salient region. For example, a fine-grained scene description of FIG. 1A may be "A dog is catching a Frisbee." Alternatively, the description provider 222 may provide a single label based on the salient region or a coarse-grained description based on the whole image depending on the target platform device type and target platform device count. For example, the single label for the image in FIG. 1A may be "dog" or "Frisbee." Provision of a single label based on the salient region is known as saliency recognition. Saliency recognition is fast compared to scene description because saliency recognition only provides a single class label instead of a sentence composed of natural language text.

The electronic device 200 may also include a display 224. The display 224 may present the description provided by the description provider 222. As such, the display 224 may present a fine-grained scene description based on the salient region, a single label based on the salient region, or a coarse-level description based on the whole image.

Communication between various components of the electronic device 200 may be accomplished via one or more busses 206. In some examples, the bus 206 may be a single bus that couples all of the components of the electronic device 200 according to a particular communication protocol. Furthermore, the electronic device 200 may also include any suitable number of busses 206 of varying types, which may use different communication protocols to couple specific components of the electronic device 200 according to the design considerations of a particular implementation.

The block diagram of FIG. 2 is not intended to indicate that the electronic device 200 is to include all of the components shown in FIG. 2. Rather, the electronic device 200 can include fewer or additional components not shown in FIG. 2, depending on the details of the specific implementation. Furthermore, any of the functionalities of the processor 202 may be partially, or entirely, implemented in hardware and/or a processor. For example, the functionality may be implemented in any combination of Application Specific Integrated Circuits (ASICs), Field Programmable Gate Arrays (FPGAs), logic circuits, and the like. In addition, embodiments of the present techniques can be implemented in any suitable electronic device, including ultra-compact form factor devices, such as System-On-a-Chip (SOC), and multi-chip modules.

Figure 3:
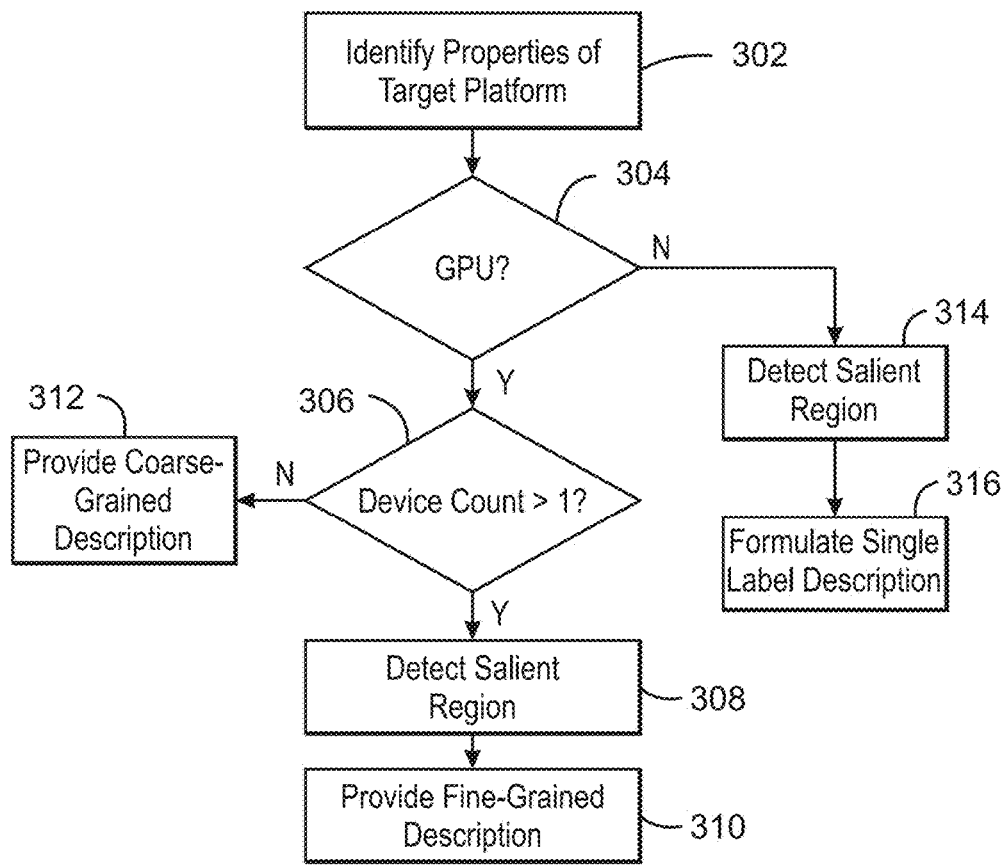
FIG. 3 is a process flow diagram of a method for visual-saliency driven scene description.

FIG. 3 is a process flow diagram of a method 300 for visual-saliency driven scene description. The method 300 may be performed by the electronic device 200 shown in FIG. 2.

At 302, the properties of the target platform may be identified by the property identifier 218 of FIG. 2. The properties are identified by polling, message passing, and the like. For example, the properties of interest may be the target platform device type and target platform device count. A low-level API may be used to identify the properties of the target platform. The use of a low-level API may allow the use of the techniques described herein with any target platform without having to change or recompile any code.

At 304, a determination may be made as to whether the target platform device type is a graphical processing unit (GPU) or a central processing unit (CPU). If it is determined that the target platform device type is a GPU at 304, the target platform device count may be determined at 306. If the GPU count exceeds one at 306, a salient region may be detected at 308. The salient region may be detected by the salient region detector 220 of FIG. 2. Salient region detection is discussed in detail below. At 310, a fine-grained description of the salient region is provided by the description provider 222 of FIG. 2. Scene description is discussed in detail below.

If the GPU count is determined to be one at 306, the method 300 proceeds to 312 where a coarse-grained description based on the entire image may be provided by the description provider 222 of FIG. 2.

If it is determined that the target platform device type is not a GPU at 304, the target platform device type may be a CPU and the method 300 may proceed to 314. At 314, a salient region is detected. At 316, a single label description of the salient region may be formulated via saliency recognition.

Saliency detection may be based on a top-down approach. In this approach, the class that the entire image belongs to may be determined. A classification-trained convolutional neural network (CNN) may be used to determine the class of the entire image. A CNN is a type of feed-forward artificial neural network. In a feed-forward neural network, information moves in one direction, forward, from the input nodes through the hidden nodes (if any) to the output nodes. There are no cycles or loops in the network.

Figure 4:
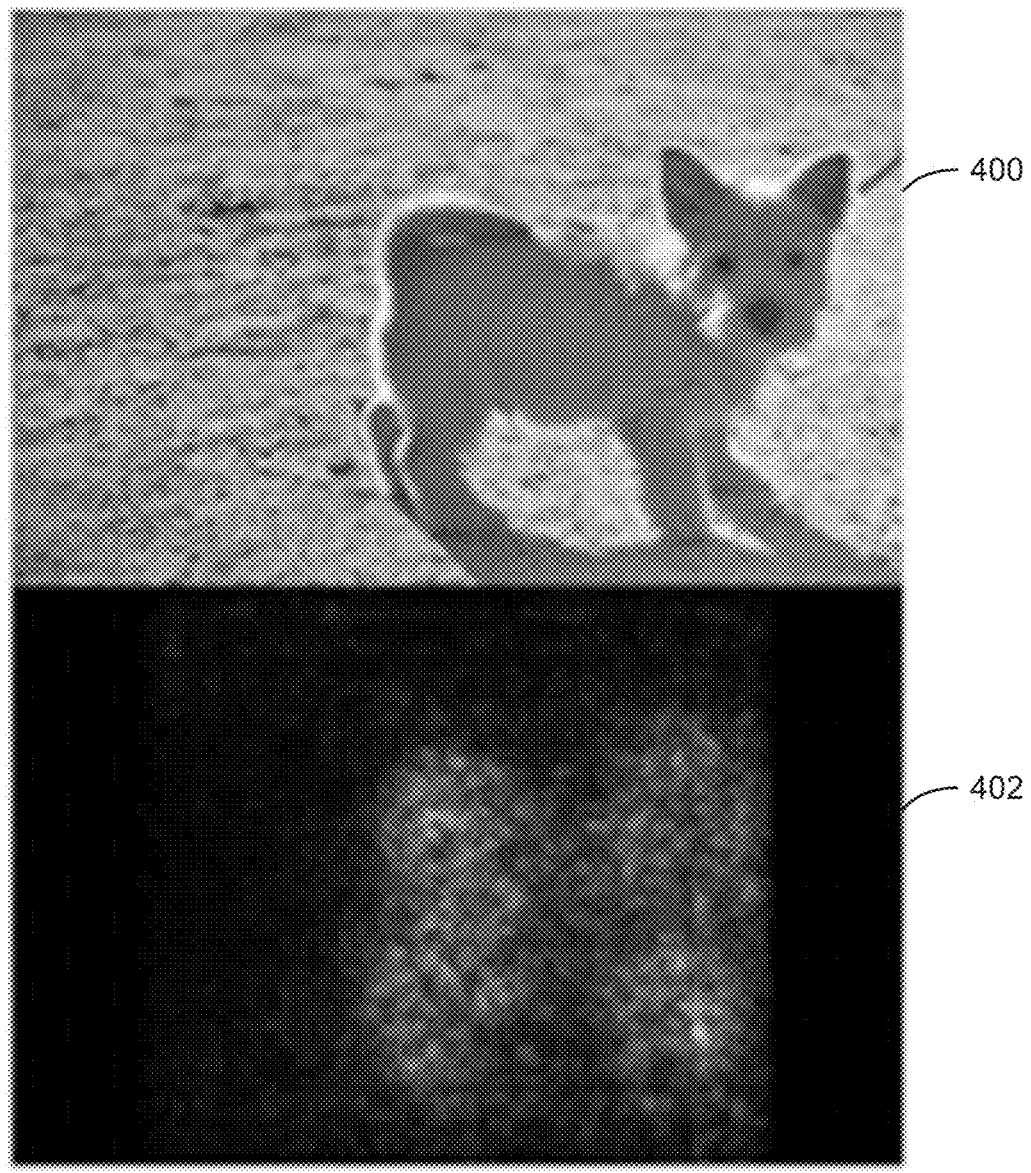
FIG. 4 is an image and its corresponding saliency map.

An image-specific class saliency map may be computed by calculating the gradient of the class score with respect to the input image. A saliency map may be generated from an input image as shown in FIG. 4. The top image 400 in FIG. 4 is an image of a dog. The bottom image 402 is the corresponding saliency map. The computation of the image-specific saliency map for a single class may be relatively fast because the computation only requires a single back-propagation pass. The computation basically identifies the most relevant regions of the image as belonging to a class. As shown in the bottom image 402 of FIG. 4, the most relevant region of the image may be identified as the region of the dog and the class is determined to be "dog." A class score may be the probability (between 0 and 1) of the prediction that the image belongs to a certain class. This probability may be a level of confidence in the prediction. An image may most likely belong to the class having the highest score. The basic idea behind this approach is to identify the pixels in the input image that may be changed the least to increase the class score the most. Such pixels may correspond to the task (object)-relevant region of the image.

The other main approach to saliency detection is a bottom-up approach. The major difference between the top-down and bottom-up approaches is that the search target is known in the top-down approach, while the bottom-up approach identifies salient points without any prior knowledge of the image.

Saliency detection is not limited to deep learning techniques such as CNN. In fact, the leveraging of saliency detection described herein is agnostic to any technology. Any technology may be used as long as it supports fine-grained scene descriptions for high-resolution images and various tasks based on the properties of the target platform.

Scene description may be accomplished using two deep neural networks such as convolutional neural networks (e.g., AlexNet, VGGNet, GoogleNet, and ResNet) and recurrent neural networks (e.g., Vanilla RNN, LSTM, and GRU). A recurrent neural network is a class of artificial neural network in which connections between units form a directed cycle. This creates an internal state of the network which allows it to exhibit dynamic temporal behavior. Unlike feedforward neural networks such as CNNs, recurrent neural networks can use their internal memory to process arbitrary sequences of inputs.

A CNN may be applied to input images and may provide the output of the top layer of the CNN (fc7 feature) as input to two stacked long short-term memories (LSTMs). Usually, the output of the top layer in a CNN may be a layer before the classification layer and is known as fc7 (fully connected layer 7). This layer may represent the visual feature vector for the input image/frame. The top LSTM may determine the visual fc7 feature vector of each frame at each time step, while the bottom LSTM may generate a sequence of words after the top LSTM is finished encoding the visual features.

Saliency recognition is different from scene description in that saliency recognition may not require a recurrent neural network like LSTM for language modeling. Saliency recognition may be similar to a typical image classification task because it identifies a single class label given an input image using a CNN. The difference is that the input image may be a salient region of the image instead of the whole image.

Figure 5:
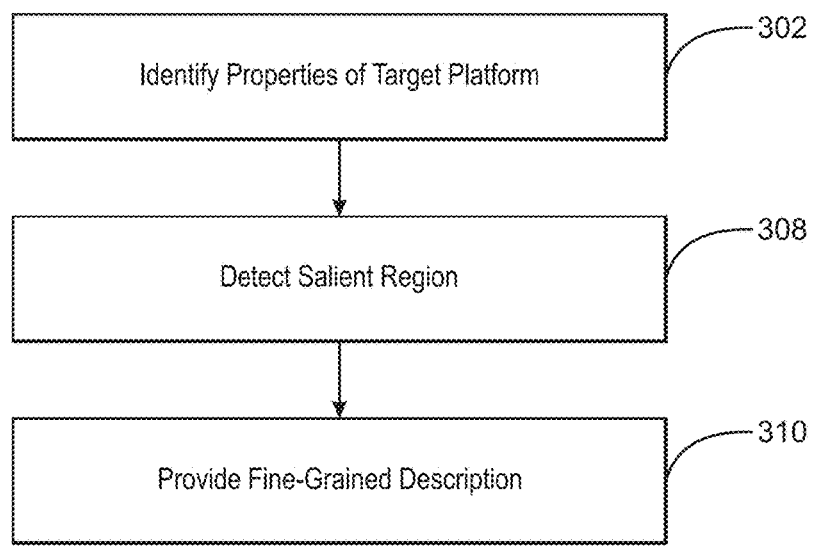
FIG. 5 is simplified flow diagram of the method shown in FIG. 3.

FIG. 5 is a simplified flow diagram of the method 300 shown in FIG. 3. At 302, the properties of a target platform may be identified. In particular, the identified properties may include the target platform device type and the target platform device count. At 308, a salient region of an input image may be detected in response to the target platform device type being a GPU and the target platform device count exceeding one. At 310, a fine-grained scene description of the salient region may be provided.

Figure 6:
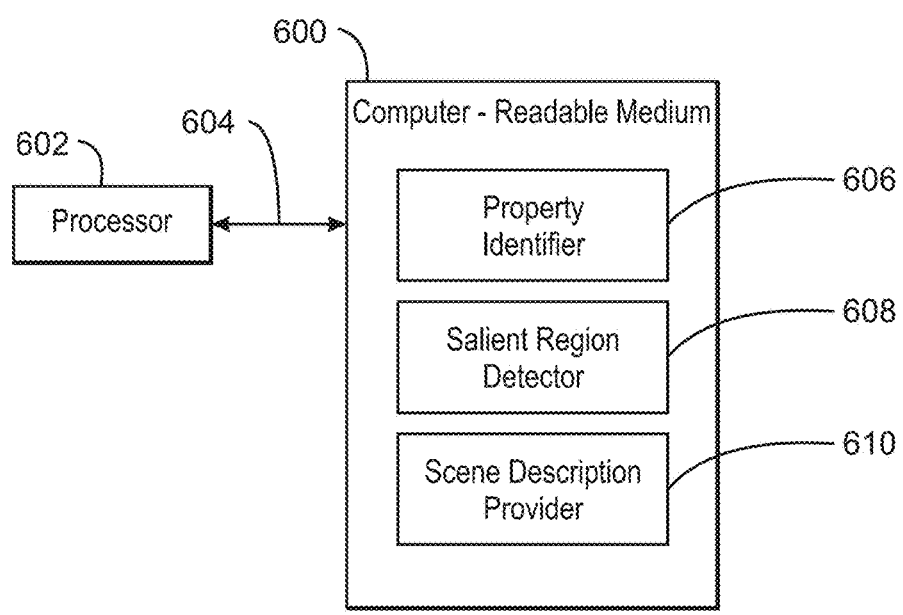
FIG. 6 is a block diagram of a medium containing code to execute visual-saliency driven scene description.

FIG. 6 is a block diagram of a medium 600 containing code to execute visual-saliency driven scene description. The medium 600 may be a non-transitory computer-readable medium that stores code that can be accessed by a processor 602 via a bus 604. For example, the computer-readable medium 600 can be a volatile or non-volatile data storage device. The medium 600 can also be a logic unit, such as an Application Specific Integrated Circuit (ASIC), a Field Programmable Gate Array (FPGA), or an arrangement of logic gates implemented in one or more integrated circuits, for example.

The medium 600 may include modules 606-610 configured to perform the techniques described herein. For example, a property identifier 606 may be configured to identify properties of a target platform. The properties of the target platform may include target platform device type and target platform device count. A salient region detector 608 may be configured to detect a salient region of an input image in response to the target platform device type being a graphical processing unit (GPU) and the target platform device count being greater than one. A scene description provider 610 may be configured to provide a fine-grained scene description of the salient region.

The block diagram of FIG. 6 is not intended to indicate that the medium 600 is to include all of the components shown in FIG. 6. Further, the medium 600 may include any number of additional components not shown in FIG. 6, depending on the details of the specific implementation.

Figure 7A:
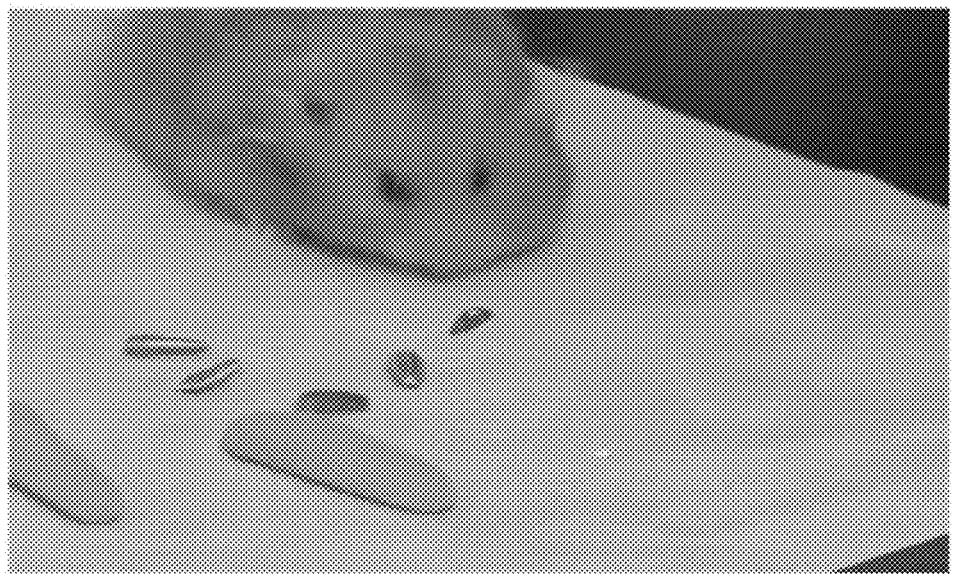
FIG. 7A is an example scene description obtained using the scene description techniques discussed herein.
Figure 7B:
FIG. 7B is another example scene description obtained using the scene description techniques discussed herein.

FIGS. 7A and 7B are examples of scene descriptions obtained using the scene description techniques discussed herein. The scene descriptions are for short (approximately 10 second) video clips. A VGGNet CNN was pre-trained on the 1.2 million ImageNet dataset and then used to extract the fc7 feature from each of the video frames. The stacked LSTMs were trained with the Microsoft Video Description Dataset that consists of YouTube™ video clips having ground-truth description sentences. Ground truth refers to information provided by direct observation as opposed to information provided by inference. The generated sentences in FIGS. 7A and 7B identify the salient content and describe the event appropriately in the context of each of the short video clips.

EXAMPLES

Example 1 is an electronic device for visual-saliency driven scene description. The electronic device includes a property identifier to identify properties of a target platform, wherein the properties comprise target platform device type and target platform device count; a salient region detector to detect a salient region of an input in response to the target platform device type being a graphical processing unit (GPU) and the target platform device count being above one; and a description provider to provide a fine-grained scene description of the salient region.

Example 2 includes the electronic device of example 1, including or excluding optional features. In this example, the salient region detector is to detect a salient region of an input in response to the target platform device type being a central processing unit (CPU), and wherein a saliency recognizer is to formulate a single label description of the salient region.

Example 3 includes the electronic device of any one of examples 1 to 2, including or excluding optional features. In this example, the scene description is coarse-grained and based on the image as a whole in response to the target platform device type being a GPU and the target platform device count being equal to one.

Example 4 includes the electronic device of any one of examples 1 to 3, including or excluding optional features. In this example, the property identifier is a low-level application programming interface (API).

Example 5 includes the electronic device of any one of examples 1 to 4, including or excluding optional features. In this example, the properties of the target platform further comprise available memory of the target platform and a resource requirement of a kernel executing on the target platform.

Example 6 includes the electronic device of any one of examples 1 to 5, including or excluding optional features. In this example, the input is an image or a sequence of images.

Example 7 includes the electronic device of any one of examples 1 to 6, including or excluding optional features. In this example, the salient region detector uses a top-down approach. Optionally, the top-down approach is to: determine the class the image belongs to; and compute an image-specific class saliency map by calculating a gradient of a class score. Optionally, determining the class the image belongs to comprises utilizing a classification-trained convolutional neural network (CNN). Optionally, calculating a gradient of a class score comprises determining a plurality of pixels that are changed the least to increase the class score the most.

Example 8 includes the electronic device of any one of examples 1 to 7, including or excluding optional features. In this example, the description provider comprises a plurality of deep neural networks.

Example 9 includes the electronic device of any one of examples 1 to 8, including or excluding optional features. In this example, the scene description for the salient region comprises natural language text.

Example 10 is a method for visual-saliency driven scene description. The method includes identifying properties of a target platform, wherein the properties comprise target platform device type and target platform device count; detecting a salient region of an input in response to the target platform device type being a graphical processing unit (GPU) and the target platform device count being above one; and providing a fine-grained scene description of the salient region.

Example 11 includes the method of example 10, including or excluding optional features. In this example, the method includes formulating a single label description of the salient region in response to the target platform device type being a central processing unit (CPU).

Example 12 includes the method of any one of examples 10 to 11, including or excluding optional features. In this example, the method includes formulating a coarse-grained scene description based on the image as a whole in response to the target platform device type being a GPU and the target platform device count being equal to one.

Example 13 includes the method of any one of examples 10 to 12, including or excluding optional features. In this example, the method includes utilizing a low-level application programming interface (API) to identify the properties of the target platform.

Example 14 includes the method of any one of examples 10 to 13, including or excluding optional features. In this example, the method includes inputting an image or a sequence of images.

Example 15 includes the method of any one of examples 10 to 14, including or excluding optional features. In this example, the method includes utilizing a top-down approach to detect the salient region of the input.

Example 16 includes the method of any one of examples 10 to 15, including or excluding optional features. In this example, the method includes determining a class the image belongs to; and computing an image-specific class saliency map by calculating a gradient of a class score. Optionally, the method includes utilizing a classification-trained convolutional neural network (CNN) to determine the class the image belongs to.

Example 17 includes the method of any one of examples 10 to 16, including or excluding optional features. In this example, the method includes utilizing natural language text to describe the salient region.

Example 18 is at least one computer-readable medium. The computer-readable medium includes instructions that direct the processor to identify properties of a target platform, wherein the properties comprise target platform device type and target platform device count; detect a salient region of an input in response to the target platform device type being a graphical processing unit (GPU) and the target platform device count being above one; and provide a fine-grained scene description of the salient region.

Example 19 includes the computer-readable medium of example 18, including or excluding optional features. In this example, the computer-readable medium includes instructions to direct the processor to formulate a single label description of the salient region in response to the target platform device type being a central processing unit (CPU).

Example 20 includes the computer-readable medium of any one of examples 18 to 19, including or excluding optional features. In this example, the computer-readable medium includes instructions to direct the processor to formulate a coarse-grained scene description based on the image as a whole in response to the target platform device type being a GPU and the target platform device count being equal to one.

Example 21 includes the computer-readable medium of any one of examples 18 to 20, including or excluding optional features. In this example, the computer-readable medium includes instructions to direct the processor to: determine the class the image belongs to; and compute an image-specific class saliency map by calculating a gradient of a class score. Optionally, the computer-readable medium includes instructions to direct the processor to utilize a classification-trained convolutional neural network (CNN) to determine the class the image belongs to. Optionally, the computer-readable medium includes instructions to direct the processor to calculate a gradient of a class score by determining the plurality of pixels that are changed the least to increase the class score the most.

Example 22 includes the computer-readable medium of any one of examples 18 to 21, including or excluding optional features. In this example, the computer-readable medium includes instructions to direct the processor to utilize a low-level application programming interface (API) to identify the properties of the target platform.

Example 23 includes the computer-readable medium of any one of examples 18 to 22, including or excluding optional features. In this example, the computer-readable medium includes instructions to direct the processor to input an image or sequence of images.

Example 24 includes the computer-readable medium of any one of examples 18 to 23, including or excluding optional features. In this example, the computer-readable medium includes instructions to direct the processor to utilize a top-down approach to detect the salient region of the input.

Example 25 includes the computer-readable medium of any one of examples 18 to 24, including or excluding optional features. In this example, the computer-readable medium includes instructions to direct the processor to utilize natural language text to describe the salient region.

Example 26 is an apparatus for visual-saliency driven scene description. The apparatus includes a means for identifying properties of a target platform, wherein the properties comprise target platform device type and target platform device count; a means for detecting a salient region of an input in response to the target platform device type being a graphical processing unit (GPU) and the target platform device count being above one; and a means for providing a fine-grained description of the salient region.

Example 27 includes the apparatus of example 26, including or excluding optional features. In this example, the apparatus includes a means for formulating a single label description of the salient region in response to the target platform device type being a central processing unit (CPU).

Example 28 includes the apparatus of any one of examples 26 to 27, including or excluding optional features. In this example, the apparatus includes a means for formulating a coarse-grained scene description based on the image as a whole in response to the target platform device type being a GPU and the target platform device count being equal to one.

Example 29 includes the apparatus of any one of examples 26 to 28, including or excluding optional features. In this example, the means for identifying properties of a target platform comprises a low-level application programming interface (API).

Example 30 includes the apparatus of any one of examples 26 to 29, including or excluding optional features. In this example, the apparatus includes a means for inputting an image or a sequence of images.

Example 31 includes the apparatus of any one of examples 26 to 30, including or excluding optional features. In this example, the means for detecting the salient region of the input comprises a top-down approach.

Example 32 includes the apparatus of any one of examples 26 to 31, including or excluding optional features. In this example, the apparatus includes a means for determining a class the image belongs to; and a means for computing an image-specific class saliency map by a means for calculating a gradient of a class score. Optionally, the means for determining a class the image belongs to comprises a classification-trained convolutional neural network (CNN). Optionally, the means for calculating a gradient of a class score comprises determining the plurality of pixels that are changed the least to increase the class score the most.

Example 33 is a mobile device capable of visual-saliency driven scene description. The device includes a property identifier to identify properties of a target platform, wherein the properties comprise target platform device type and target platform device count; a salient region detector to detect a salient region of an input in response to the target platform device type being a graphical processing unit (GPU) and the target platform device count being above one; and a description provider to provide a fine-grained scene description of the salient region.

Example 34 includes the device of example 33, including or excluding optional features. In this example, the salient region detector is to detect a salient region of an input in response to the target platform device type being a central processing unit (CPU), and wherein a saliency recognizer is to formulate a single label description of the salient region.

Example 35 includes the device of any one of examples 33 to 34, including or excluding optional features. In this example, the scene description is coarse-grained and based on the image as a whole in response to the target platform device type being a GPU and the target platform device count being equal to one.

Example 36 includes the device of any one of examples 33 to 35, including or excluding optional features. In this example, the property identifier is a low-level application programming interface (API).

Example 37 includes the device of any one of examples 33 to 36, including or excluding optional features. In this example, the properties of the target platform further comprise available memory of the target platform and a resource requirement of a kernel executing on the target platform.

Example 38 includes the device of any one of examples 33 to 37, including or excluding optional features. In this example, the input is an image or a sequence of images.

Example 39 includes the device of any one of examples 33 to 38, including or excluding optional features. In this example, the salient region detector uses a top-down approach. Optionally, the top-down approach is to: determine the class the image belongs to; and compute an image-specific class saliency map by calculating a gradient of a class score. Optionally, determining the class the image belongs to comprises utilizing a classification-trained convolutional neural network (CNN). Optionally, calculating a gradient of a class score comprises determining a plurality of pixels that are changed the least to increase the class score the most.

Example 40 includes the device of any one of examples 33 to 39, including or excluding optional features. In this example, the description provider comprises a plurality of deep neural networks.

Example 41 includes the device of any one of examples 33 to 40, including or excluding optional features. In this example, the scene description for the salient region comprises natural language text.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the method or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An electronic device for visual-saliency driven scene description, comprising:
 a processor that is configured to:
 identify properties of a target platform, wherein the properties comprise target platform device type and target platform device count;
 determine that the target platform device type is a graphical processing unit (GPU) and the target platform device count is greater than one;
 detect a salient region of an input in response to the target platform device type being the GPU and the target platform device count being greater than one; and
 provide a fine-grained scene description of the salient region, wherein the detecting and providing is based on a machine learning algorithm.

2. The electronic device for visual-saliency driven scene description of claim 1, comprising detecting a salient region of the input in response to the target platform device type being a central processing unit (CPU), and wherein the processor is to formulate a single label description of the salient region.

3. The electronic device for visual-saliency driven scene description of claim 1, wherein the processor is to formulate a coarse-grained scene description based on the input as a whole in response to the target platform device type being a GPU and the target platform device count being equal to one.

4. The electronic device for visual-saliency driven scene description of claim 1, wherein the properties of the target platform are identified via a low-level application programming interface (API).

5. The electronic device for visual-saliency driven scene description of claim 1, wherein the properties of the target platform further comprise available memory of the target platform and a resource requirement of a kernel executing on the target platform.

6. The electronic device for visual-saliency driven scene description of claim 1, wherein the input is an image or a sequence of images.

7. The electronic device for visual-saliency driven scene description of claim 1, wherein the salient region of an input is detected via a top-down approach.

8. The electronic device for visual-saliency driven scene description of claim 7, wherein the top-down approach is to:
 determine a class the input belongs to; and compute an image-specific class saliency map by calculating a gradient of a class score.

9. The electronic device for visual-saliency driven scene description of claim 8, wherein determining the class the input belongs to comprises utilizing a classification-trained convolutional neural network (CNN).

10. The electronic device for visual-saliency driven scene description of claim 8, wherein calculating a gradient of a class score comprises determining a plurality of pixels that are changed the least to increase the class score the most.

11. The electronic device for visual-saliency driven scene description of claim 1, wherein a plurality of deep neural networks is executed to provide the fine-grained scene description for the salient region.

12. The electronic device for visual-saliency driven scene description of claim 1, wherein the scene description for the salient region comprises natural language text.

13. A method for visual-saliency driven scene description, comprising:
  identifying properties of a target platform, wherein the properties comprise target platform device type and target platform device count;
  determining that the target platform device type is a graphical processing unit (GPU) and the target platform device count is greater than one;
  detecting a salient region of an input in response to the target platform device type being the GPU and the target platform device count being greater than one; and
  providing a fine-grained scene description of the salient region, wherein the detecting and providing is based on a machine learning algorithm.

14. The method of claim 13, comprising determining the target platform device type is a central processing unit (CPU) and formulating a single label description of the salient region in response to the target platform device being the CPU.

15. The method of claim 13, comprising determining the target platform device type is the GPU and the target platform device count is equal to one and formulating a coarse-grained scene description of the input as a whole in response to the target platform device count being equal to one.

16. The method of claim 13, comprising utilizing a low-level application programming interface (API) to identify the properties of the target platform.

17. The method of claim 13, comprising inputting an image or a sequence of images.

18. The method of claim 13, comprising utilizing a top-down approach to detect the salient region of the input.

19. The method of claim 13, comprising:
  determining a class to which the input belongs; and
  computing an image-specific class saliency map by calculating a gradient of a class score.

20. The method of claim 19, comprising utilizing a classification-trained convolutional neural network (CNN) to determine which class the input belongs.

21. The method of claim 13, comprising utilizing natural language text to describe the salient region.

22. At least one non-transitory computer-readable medium, comprising instructions to direct a processor to:
  identify properties of a target platform, wherein the properties comprise target platform device type and target platform device count;
  determine that the target platform device type is a graphical processing unit (GPU) and the target platform device count is greater than one;
  detect a salient region of an input in response to the target platform device type being the GPU and the target platform device count being greater than one; and
  provide a fine-grained scene description of the salient region, wherein the detecting and providing is based on a machine learning algorithm.

23. The at least one non-transitory computer-readable medium of claim 22, comprising instructions to direct the processor to determine the target platform device type is a central processing unit (CPU) and formulate a single label description of the salient region when the target platform device is the CPU.

24. The at least one non-transitory computer-readable medium of claim 22, comprising instructions to direct the processor to determine the target platform device type is the GPU and the target platform device count is equal to one and formulate a coarse-grained scene description of the input as a whole in response to the target platform device count being equal to one.

25. The at least one non-transitory computer-readable medium of claim 22, comprising instructions to direct the processor to:
  determine a class to which the input belongs; and
  compute an image-specific class saliency map by calculating a gradient of a class score.

\* \* \* \* \*